May 3, 1966   M. R. MAYNARD   3,248,830
RETRACTABLE HANGAR
Filed Dec. 12, 1961   5 Sheets-Sheet 1
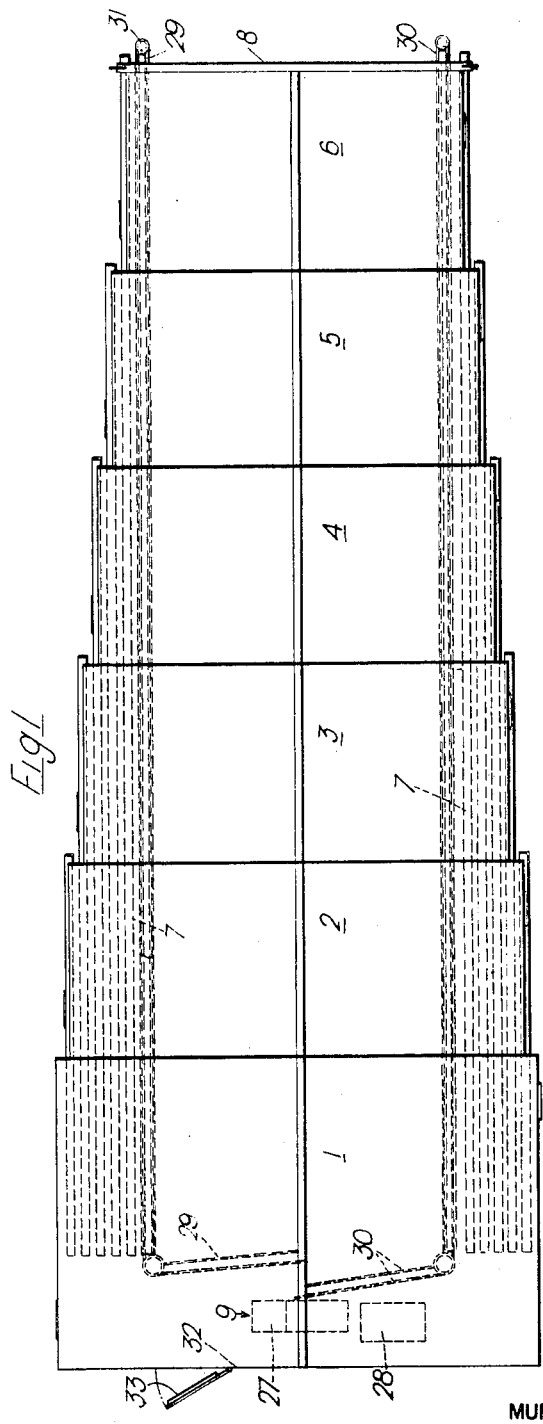
INVENTOR.
MURRAY RENOUF MAYNARD
BY *Amster & Levy*
ATTORNEYS

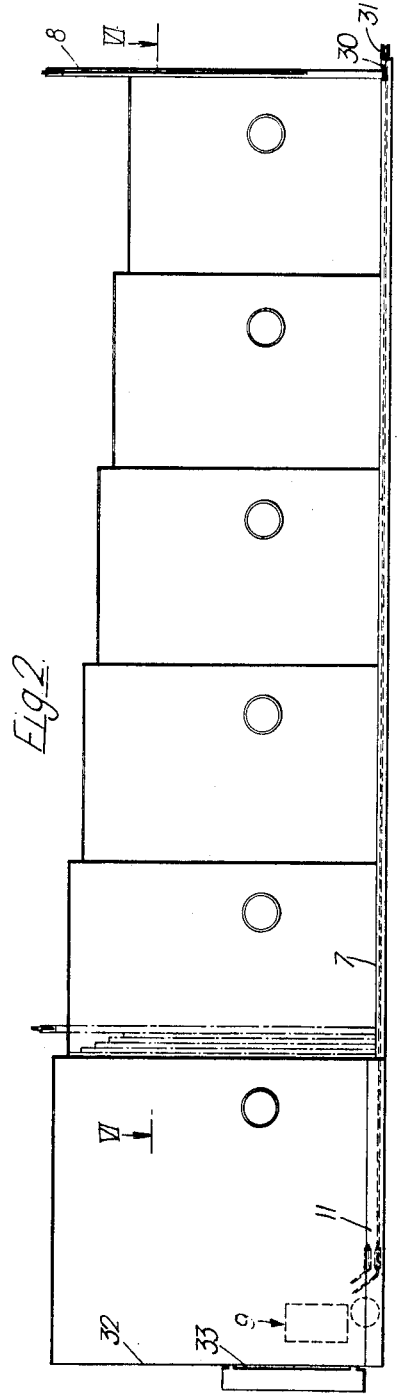

May 3, 1966 M. R. MAYNARD 3,248,830
RETRACTABLE HANGAR
Filed Dec. 12, 1961 5 Sheets-Sheet 3
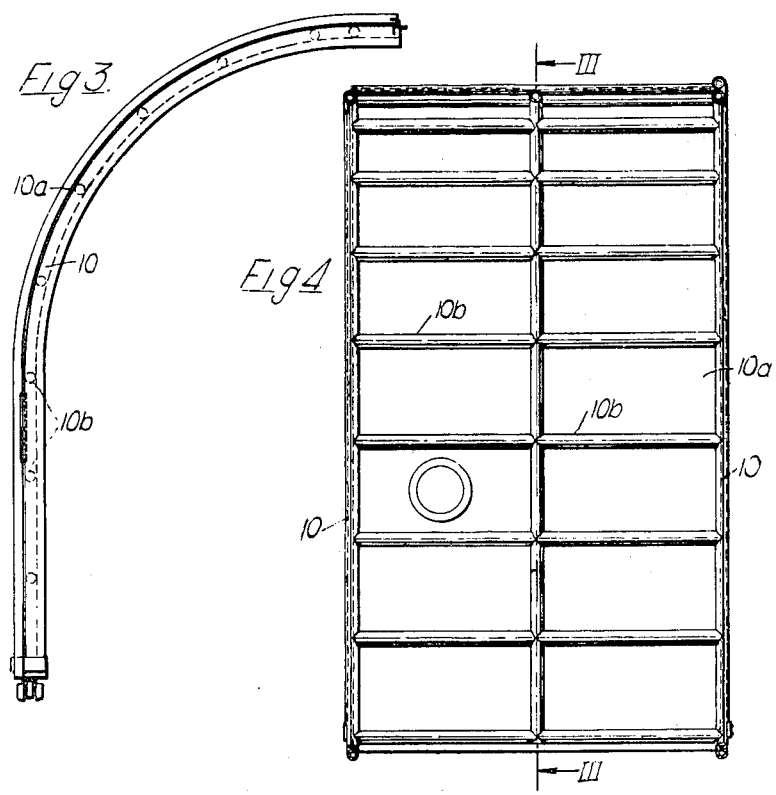
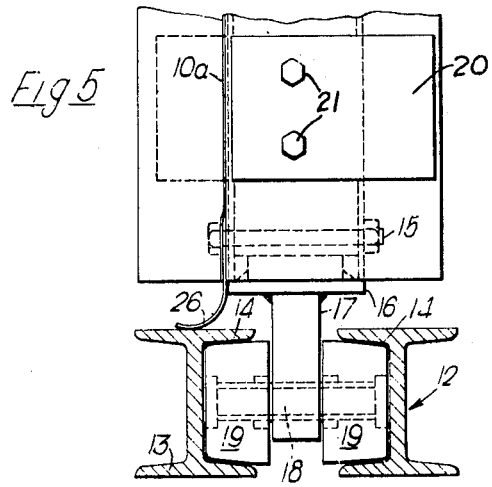
INVENTOR.
MURRAY RENOUF MAYNARD
BY *Amster & Levy*
ATTORNEYS May 3, 1966  M. R. MAYNARD  3,248,830
RETRACTABLE HANGAR
Filed Dec. 12, 1961  5 Sheets-Sheet 4
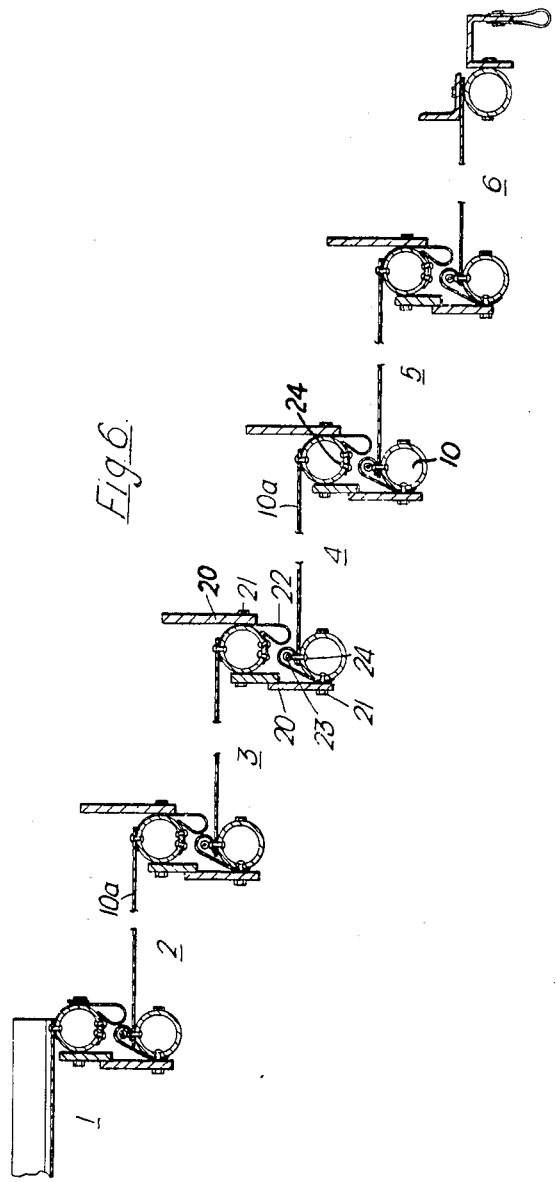
INVENTOR.
MURRAY RENOUF MAYNARD
BY
ATTORNEYS May 3, 1966 M. R. MAYNARD 3,248,830
RETRACTABLE HANGAR
Filed Dec. 12, 1961 5 Sheets-Sheet 5
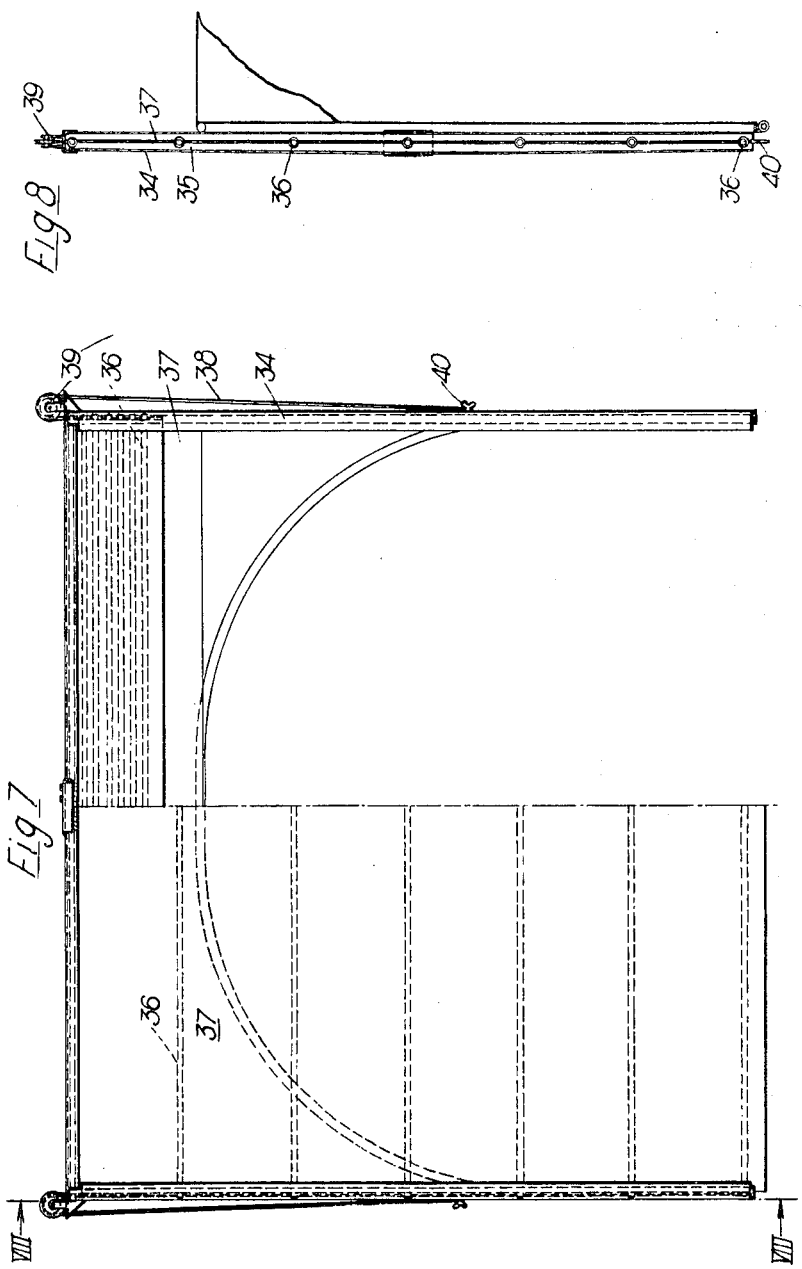
INVENTOR.
MURRAY RENOUF MAYNARD
BY *Amster & Levy*
ATTORNEYS

United States Patent Office 3,248,830
Patented May 3, 1966

3,248,830
RETRACTABLE HANGAR
Murray Renouf Maynard, 67 Castleknock Road,
Toronto, Ontario, Canada
Filed Dec. 12, 1961, Ser. No. 158,716
2 Claims. (Cl. 52—67)

This invention relates to retractable hangars and like structures such as storage sheds and more particularly but not exclusively to such hangars for use on board ship for use in deck storage of helicopters.

On naval ships, ice-breakers and other marine vessels, helicopters are widely employed and stowed on deck, but it is highly desirable to protect the stowed aircraft against exposure to the pervading atmospheric conditions, sea water, corrosive fumes from the ship's funnel, and other causes of damage to the aircraft. Moreover it is desirable to be able to protect personnel which are servicing the aircraft. Helicopters require a clear space in which to land and take off and the size of such space is governer by the diameter of the main rotor, normally at least forty feet. For housing the helicopter on ships' decks the length of the hangar is equally governed by the main rotor diameter, so that while it is desirable to house the helicopter in a deck hangar, the hangar and landing platform occupy a space either not available on the vessels or too valuable to allot entirely to the helicopter.

The main object of the present invention is to provide a retractable hangar or like structure which can be retracted into a minimum of space or extended to form a storage housing thereby for example reducing the deck area of a marine vessel allotted to a helicopter and permitting the servicing under cover of the stored helicopter, preferably at a comfortable temperature for the personnel to work in.

According to the present invention a retractable hangar or like structure for use on marine vessels for example comprises a section fixed to a firm base, tracks fixable to the base and extending away from one end of each side of the fixed section, a number of movable sections movable along the tracks from a retracted position where they are telescoped one with respect to the other and, to the fixed section, to an extended position with all the sections substantially in end to end relationship, a closure at the outer end of the outermost section in the extended position and movable to an open position, sealing means to close the gaps between the sides of the sections and the base or tracks and between all the sections, and means operable to move the sections automatically into and out of the retracted position from the extended position. Preferably the movable sections in the retracted position are one within the other and within the fixed section. The closure at the outer end of the outermost section is preferably constructed so as to leave the said outer end unobstructed in the open position.

In a preferred construction the movable sections are connected to one or more cables or the like driven from a winch or the like disposed within the fixed section. Or the sections or at least the outermost section may be provided with its own power. The driving means is preferably controlled from within the fixed section.

A heater may be provided in the fixed section to heat the interior of the extended structure, and an exhaust fan may be provided to aid the air flow through the structure.

Each section preferably has an inverted U-shaped cross-section comprised of U-shaped structural members interconnected by bracing members and covered by waterproof material. The structural members may be tubular or of I, H, T, L, [ or other cross-section. Alternatively the sections are each formed of a filler material shaped to the cross-section of the section and covered with a skin on at least the outer side.

The tracks are preferably of I or H cross-section and each movable section is provided with wheels at the base of each side near each end, said wheels being retained and running in and between the two tracks.

The closure at the outer end of the outermost section preferably comprises a number of spaced horizontal members vertically slidable along uprights on the outermost movable section and a pliable material is connected to the horizontal members to form the closure, the closure being upwardly collapsible to enable the movable sections to be extended over a helicopter or other unit standing on the fixed base. The closure may however be formed of a roll up construction, e.g. of metal or may be sliding doors. Sealing means are preferably provided to seal the gaps between the closed closure and the outer end of the outermost movable section.

In order that the invention may be more clearly understood one embodiment in accordance therewith will now be described by way of example with reference to the drawings accompanying the provisional specification in which:

FIGURE 1 is a plan view of an extended structure intended to be a hangar on a ship's deck for a helicopter;

FIGURE 2 is a side elevation of the structure of FIGURE 1;

FIGURE 3 is a cross-section of the line III—III of FIGURE 4 looking in the direction of the arrows;

FIGURE 4 is a side view of a moving section of the structure of FIGURES 1 and 2;

FIGURE 5 is an enlarged cross-section through one pair of tracks on one side of the structure showing the wheels on the lower part of one side wall of a moving section of the structure;

FIGURE 6 is a horizontal cross-section on the line VI—VI on FIGURE 1;

FIGURE 7 is an end view of the structure of FIGURES 1 and 2 showing the closure at the outer end of the outermost end section, the left half showing the closure closed and the right half showing it open; and FIGURE 8 is a side view of the closure in FIGURE 7.

In the drawings the same references are used to designate the same parts.

Referring to the drawings the retractable structure shown is particularly suitable as a hangar for a helicopter on a ship's deck and comprises a fixed section 1 fixed on three sides by any conventional means such as bolts to a firm base, e.g. the ship's deck, and a number of movable sections 2–6, movable to the extended position of FIGURES 1 and 2 along tracks 7 from a retracted position telescoped one within the other and within the fixed section; the retracted structure is indicated by dotted lines in FIGURE 2; in the extended position the sections 1–6 are in substantially end to end relationship with sealing means to close the gaps between each section and the adjoining section or sections and between each section and the base. A closure or door 8 is provided at the outer end of the outermost section 6 and is movable to an open position preferably as shown to leave the outer end of section 6 substantially unobstructed. Operating means 9 are provided and operable from within the fixed section to move the sections automatically from the retracted to the extended position and vice versa.

Each of the sections 1–6 has an inverted U-shaped transverse cross-section and is made up of U-frame members 10 in the vertical plane interconnected by horizontal members 10b, all of tubular metal such as steel, aluminum or light metal alloys, covered with metal, preferable aluminum, plates 10a and which are or are treated to be resistant to weather conditions and corrosion by for example sea water and ships funnel gases. The fixed section 1 is fixed by its bottom frame members 11 to the fixed base, and extending away therefrom in the direction of movement of the sections 2–6 are two parallel sets of tracks 12 made up of H or I beams fixed to the fixed base. Since the selections 2–6 telescope one within the other and each section has runners at the bottom of its wall, there is a pair of tracks for each moving section so that within the fixed member there are six tracks at each side. These tracks may be recessed within the fixed base or raised the fixed base. They are preferably recessed and in either case temporary plate-like covers or gratings are provided to close the gaps between the tracks, the covers preferably being flush with the top of the base. With hangars for wheeled helicopters the gaps between the tracks are not normally large enough for the wheels to enter between them, but it is preferable to cover the gaps with plates to prevent the ingress of dirt and to give a flush deck surface.

Referring to FIGURE 5 this shows the lower end of one side of a moving section and its twin track. The track is formed of two longitudinal beams 13 having inwardly facing channels 14 which in the drawing are provided by the tracks being of I-shape, but they could be of H or [-shape and may be unitary beams or made up of separate horizontal and vertical portions suitably secured together as by welding or rivets. The tracks can be made of iron or aluminum.

The lower end of the section wall has secured to it as by bolts 15 a runner mounting 16 the lower end 17 of which extends below the section wall so as to extend downwardly between the beams 13. The extension or end 17 is bored to receive an axle 18 which projects from each side to form stub axles on which are rotatably mounted wheels 19, preferably on anti-friction bearings such as self-oiling bearings. The diameter of the wheels 19 is such that they are a close but free rolling fit in the track channels 14 so that the wheels cannot move out of the tracks and the moving sections cannot lift off the tracks.

As shown in cross-section in FIGURE 6 each section end tubular frame member 10 has stop members 20 which are about 6 inches high for example and each is disposed to engage the stop member on the next adjoining sections so that in the telescopic extending movement the sections do not move completely out of one another. Also in the retracted position the stops also limit the inward movement of the sections. The stop members 20 are fixed to the frame members 10 by rivets, or other suitable means such as bolts may be used.

Since the control position, heater and other fittings are disposed at the inner end of the fixed section 1 this latter is longer than the sections 2–6 and the stops prevent the moving sections moving so far into the section 1 to foul said position and fittings.

Strips 22 of a flexible sealing material, e.g. sheet rubber or synthetic resin, are secured to the end frame members 10 or to the actual end portion of each section as by the rivets 21 or the like and their other i.e. inner edge portions are secured by rivets 24 or the like to the adjacent parts of the same section (in FIG. 6 the tubes 10), the intermediate portions of the strips being billowed out on the outer section frame member 10, while the intermediate portions of the inner section frame members 10 are rolled round a reinforcement 23 such as a flexible pipe or hose secured by the rivets 24 or the like which also secure the sheet metal plates 10a of the section to the members 10. Thus when adjoining sections are in the fully extended position the two strips engage in compression and seal the gaps between the sections.

To provide a weather-tight seal between the bottoms of the sides of the sections, as seen in FIGURE 5 a strip of flexible sealing material such as rubber or synthetic resin is secured to the section wall by the bolts 15 or other means such as rivets (not shown) and the strip is wider than the vertical gap between the section wall and the fixed base or tracks so that it bends over outwardly as at 26 to form the seal even during movement in the case of the sections 2–6. Thus both when fully retracted and fully extended the sections form a length of coverage which is proof against the weather, water and atmospheric gases as from a ship's funnel.

To move the sections 2–6 from the retracted to the extended position or vice versa operating means are provided comprising motor 27, which may be an electric motor, e.g. a 2 hp. totally enclosed, explosion proof, A.C. or D.C. motor, or donkey engine on a ship or other prime mover, driving a winch 28, shown diagrammatically in FIGURES 1 and 2, the winch having cables 29, 30 which run along each side of and within the sections, round wheels 31 at the outer end of the outermost section 6, and back to the winch. Thus on actuation of the motor 27 the winch will wind up or unwind the cable.

One cable 29 is fixed to the inner end of the section 6 and after passing along the sections round the wheel 31 runs back along the sections to the winch, so that by the winch winding in the cable the section 6 will telescope out of the section 5 until the stop members 26 of the two sections 6 and 5 engage, when the cable will pull both the sections 5 and 6 out of section 4 and so on until the whole has moved to the fully extended position.

To retract the hangar, the cable 30 has both ends connected to the winch so that as the winch winds in the cable 30 the section 6 will move into the section 5 until their outer stop members 22 engage when the cable will move sections 6 and 5 together onto section 4 and so on until all the sections 2–6 are fully telescoped within the fixed section 1.

However a cable 30 and a cable 29 may be provided at each side so as to ensure an even pull on both sides of the sections. The winch has a drum for each cable or a single drum having different portions on which each cable is wound: alternatively separate winches may be provided driven from the same motor, or from separate motors which are synchronized in the conventional manner.

The motor or motors are provided in the fixed section 1 or they may be housed in a compartment in the fixed base, but preferably so as to be protected from the weather. The motor or motors are controlled from an operating position within the fixed section 6. The movement of the sections may at the control position be controlled by a momentary push-button control, a magnetic reversing starter, and two limit switches one at each end of the hanger track, when using an electric motor or motors.

The limit switches are disposed and connected in the electric control circuit so that they over-ride the push-button switches and thus prevent damage to the structure during movement.

The inner end of the fixed section 6 is permanently closed by a wall 32 having an access door 33 and the wall is sealed in a waterproof and weathertight manner to the end of the section 6. Preferably the motor control position is against the end wall 32 on which a control panel of conventional construction may be mounted.

It is desirable to have air conditioning in the hangar, and also a heater 33, and the air conditioning and/or heating devices of known construction are then disposed in the fixed section 6 preferably close to the wall 32, so as not to waste space in the hangar and so as not to be fouled by the retracted moving sections. A suitable heater is designed to provide a working temperature e.g. 60° F. in the hangar when the outside temperature is —40° F. and on a ship may be a steam heat exchanger fed from the ship's heating system with a blower with a 230 volt explosion proof D.C. motor.

The outer end of the outer section 6 is closed by a closure or door 8. A suitable closing means is shown in FIGURES 7 and 8, which has a frame 34 with uprights having inwardly directed grooves 35 to receive the ends of rigid rods 36 e.g. in the form of aluminum tubes; the rods 36 are mounted in or on a flexible curtain 37, e.g. sewn therein, of waterproof material e.g. rubberized nylon fabric and are connected by ropes, chains or cables 38 passing over pulleys 39 to enable the curtain to be raised concertinawise by hand to the top of the end of section 6 leaving the section end substantially unobstructed and the floor surface of the fixed base completely level and free. The free ends of the ropes 38 can be wound on hooks 40 on the frame 34 or otherwise suitably secured or they may be wound round a drum having a driving or rotating device mounted on the frame 34. The bottom of the curtain has a transverse rod 36 to the lower edge of which a sealing strip 41 is attached to seal the door bottom to the fixed base when closed. The edges of the curtain lie within the grooves 35 or are provided with sealing strips to seal the sides of the curtain when closed. Means may be provided to lock the door in its lowermost position.

The sections 1–6 may have windows shown as portholes 42 to illuminate the hangar in daylight and artificial lighting may also be provided within the hangar if desired. Ventilators may also be provided in any or all of the sections 1–6.

In a suitable hangar construction for the ship's deck storage of a helicopter for example, the moving sections 2–6 are about 8 feet long and the side walls of the sections rise to about 5½ feet from the fixed base before curving into the roof arches. The fixed section is longer to provide space for the fittings therein. Although five moving sections are shown, any number may be employed providing the innermost section is of a size to move freely over the helicopter when the structure forms a hangar.

In an alternative construction on the fixed section in the telescoped position is the inside of the movable sections and the movable sections move one over the other so that the outermost section 6 in the extended position is the widest in cross section. While the fixed and movable sections have been described as of U-shape they may be of any suitable cross section for example semicircular, semi-elliptical or rectangular, and the frame members similarly shaped may be of tubes or I, H, or L or other cross section e.g. T or [ shaped.

Alternatively the frame members may be omitted and the sections each formed of a basic frame having the form of the section and made of a filler material such as a honeycomb of metal e.g., aluminum or plastic, e.g., stryafoam or a laminated board or plastic material, covered on the outside and if desired on the inside with a stressed skin of metal, plastic or other suitable material.

Moreover the movable sections instead of being operated by winches and cables may be driven from the motor or other prime mover through gearing and a chain drive or the prime mover, e.g., an electric motor may be mounted on the outer movable section 6 and drivingly connected as by gearing to the section wheels to drive them and then the outer section 6 will draw the sections out of or push them into the inner and fixed sections in succession; or a motor may be provided on each section to move the movable sections from one position to the other.

In an alternative door construction, the door may be a metal roll up door or sliding panel doors may be employed at the outer end of the outermost section.

The sections may be made sufficiently strong to carry radar aerials or other equipment and where space permits as on the fixed section a gun mounting or other equipment may be mounted.

Also the hangar may be double ended with movable sections such as 2–6 telescoping over or into each end of the fixed central section which will then be long enough to accommodate both sets of movable sections and have a central area between the two sets of telescoped sections to accommodate the control panel, motors and extending gear, work benches, and other equipment.

I claim:

1. A retractable hangar of substantially inverted U-shaped cross-section, comprising a fixed section and a plurality of movable sections, said movable sections having wheels rotatably mounted at the lower edges thereof, said fixed section adapted to be anchored to a firm base, a plurality of tracks fixable to said firm base and extending from one end of each side of the fixed section, each of said tracks formed of a pair of I-shaped members extending parallel to each other in a horizontal direction and being closely spaced to form a groove in which the wheels on the movable sections ride whereby said wheels cannot be lifted off said tracks, said movable sections telescoped one with respect to the other and to the fixed section and movable along the tracks from a retracted telescoped position to an extended position, each of said U-shaped sections comprising structural members of U-shaped configuration interconnected by bracing members and covered by waterproof material, said structural members comprising tubular members, stops mounted on the tubular members of adjacent sections for limiting inward and outward movement of adjacent sections relative to each other, means for moving the movable sections from the retracted position to the extended position and from the extended position to the retracted position, sealing means to close the gaps between the sections, the outer end of the outermost section having an opening extending substantially the entire area thereof, and a closure member for said opening.

2. A retractable hangar as defined in claim 1, wherein the plurality of tracks comprises a pair of tracks for each movable section, each pair of tracks being laterally spaced from one another.

References Cited by the Examiner

UNITED STATES PATENTS

| 1,456,478 | 5/1923 | White | 189—1 |
| 1,896,433 | 2/1933 | Windeknecht | 20—2 |
| 2,902,312 | 9/1959 | Ferrera | 52—67 X |

FRANK L. ABBOTT, *Primary Examiner.*

JOEL REZNEK, *Examiner.*

W. L. SHEDD, R. S. VERMUT, *Assistant Examiners.*